(12) United States Patent
Varghese et al.

(10) Patent No.: US 11,803,316 B2
(45) Date of Patent: Oct. 31, 2023

(54) CO-LOCATED JOURNALING AND DATA STORAGE FOR WRITE REQUESTS

(71) Applicant: NetApp, Inc., San Jose, CA (US)

(72) Inventors: Kevin Daniel Varghese, San Jose, CA (US); Ananthan Subramanian, San Ramon, CA (US); Parag Sarfare, San Jose, CA (US); Sandeep Yadav, Santa Clara, CA (US); Suhas Urkude, San Ramon, CA (US); Rajesh Khandelwal, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/868,260

(22) Filed: Jul. 19, 2022

(65) Prior Publication Data
US 2022/0357868 A1    Nov. 10, 2022

Related U.S. Application Data

(63) Continuation of application No. 17/239,189, filed on Apr. 23, 2021, now Pat. No. 11,409,457.

(51) Int. Cl.
*G06F 3/06* (2006.01)

(52) U.S. Cl.
CPC ............ *G06F 3/0644* (2013.01); *G06F 3/064* (2013.01); *G06F 3/067* (2013.01); *G06F 3/0613* (2013.01); *G06F 3/0623* (2013.01); *G06F 3/0659* (2013.01)

(58) Field of Classification Search
CPC .... G06F 3/0644; G06F 3/0613; G06F 3/0623; G06F 3/064; G06F 3/0659; G06F 3/067
See application file for complete search history.

(56) References Cited

U.S. PATENT DOCUMENTS

| 8,554,734 | B1* | 10/2013 | Chatterjee ........... G06F 11/1451 707/674 |
| 8,805,886 | B1 | 8/2014 | Kiselev et al. |
| 9,552,242 | B1 | 1/2017 | Leshinsky et al. |
| 10,169,169 | B1 | 1/2019 | Shaikh et al. |
| 10,289,321 | B1* | 5/2019 | Baryudin .............. G06F 3/0679 |

(Continued)

OTHER PUBLICATIONS

Containers as a Service. Bring Data Rich Enterprise Applications to your Kubernetes Platform [online]. Portworx, Inc. 2021, 8 pages [retrieved on Nov. 9, 2021]. Retrieved from the Internet: ">">https://portworx.com/containers-as-a-service/.

(Continued)

*Primary Examiner* — Ryan Bertram
(74) *Attorney, Agent, or Firm* — Jaffery Watson Mendonsa & Hamilton LLP

(57) ABSTRACT

A method and system for co-locating journaling and data storage based on write requests. A write request that includes metadata and data is received from a client. A logical storage unit for storing the metadata and the data is identified. The logical storage unit is divided into a journal partition and a volume partition. The journal partition includes a first log and a second log. Which of the first log and the second log is an active log and which of the first log and the second log is an inactive log are identified. The metadata is recorded in a first location in the active log and the data is recorded in a second location in the active log during a single I/O operation. A reply is sent to the client after the metadata and the data are recorded in the journal partition.

30 Claims, 8 Drawing Sheets

(56) References Cited

U.S. PATENT DOCUMENTS

| | | | |
|---|---|---|---|
| 10,303,663 | B1 | 5/2019 | Kinney, Jr. et al. |
| 11,340,812 | B2 | 5/2022 | Pattabiraman et al. |
| 11,409,457 | B1 | 8/2022 | Varghese et al. |
| 2007/0180000 | A1* | 8/2007 | Mine .................. G06F 11/1471 |
| 2008/0201391 | A1 | 8/2008 | Arakawa et al. |
| 2012/0198123 | A1 | 8/2012 | Post |
| 2012/0324163 | A1 | 12/2012 | Sato et al. |
| 2014/0173186 | A1 | 6/2014 | Randall et al. |
| 2014/0344507 | A1 | 11/2014 | Piggin et al. |
| 2015/0317226 | A1 | 11/2015 | Sarfare et al. |
| 2016/0110120 | A1 | 4/2016 | Pattabiraman et al. |
| 2016/0217174 | A1 | 7/2016 | Takahashi et al. |
| 2017/0123685 | A1* | 5/2017 | Zuo ....................... G06F 3/0664 |
| 2020/0133519 | A1* | 4/2020 | Peterson ............... G06F 3/0679 |
| 2022/0342577 | A1 | 10/2022 | Varghese et al. |

OTHER PUBLICATIONS

Containers vs. Microservices: What's The Difference? [online]. BMC, 2021, 19 pages [retrieved on Nov. 9, 2021]. Retrieved from the Internet: ">" title="Link: https://www.bmc.com/blogs/containers-vs-microservices/>">https://www.bmc.com/blogs/containers-vs-microservices/.

Docker vs Virtual Machines (VMs) : A Practical Guide to Docker Containers and VMs [online]. Jan. 16, 2020. Weaveworks, 2021, 8 pages [retrieved on Nov. 9, 2021]. Retrieved from the Internet: ">" title="Link: https://www.weave.works/blog/a-practical-guide-to-choosing-between-docker-containers-and-vms>">https://www.weave.works/blog/a-practical-guide-to-choosing-between-docker-containers-and-vms.

How to Orchestrate the Modern Cloud with Kubernetes [online]. Accenture, 2021, 7 pages [retrieved on Nov. 9, 2021]. Retrieved from the Internet: ">">https://www.accenture.com/us-en/blogs/software-engineering-blog/kralj-orchestrate-modern-cloud-kubernetes.

Joshi A., "From there to here, from here to there, Containers are Everywhere!," Dec. 16, 2020 [online], Nutanix. Dev, 2021, 14 pages [Retrieved on Nov. 9, 2021], Retrieved from the Internet: URL:"title=" Link: https://www.nutanix.dev/2020/12/16/from-there-to-here-from-here-to-there-containers-are-everywhere/>">https://www.nutanix.dev/2020/12/16/from-there-to-here-from-here-to-there-containers-are-everywhere/.

Karbon Kubernetes Orchestration. Management Made Simple. [online]. Nutanix, 2021, 12 pages [retrieved on Nov. 9, 2021], Retrieved from the Internet: ">">https://www.nutanix.com/products/karbon.

Pods [online]. Kubernetes, 2021, 6 pages [retrieved on Nov. 9, 2021], Retrieved from the Internet: ">">https://kubernetes.io/docs/concepts/workloads/pods/.

Portworx Data Services, the Complete Solution for Deploying Production-Grade Data Services on Kubernetes. [online], Portworx, Inc. 2021, 5 pages [Retrieved on Nov. 9, 2021]. Retrieved from the Internet: ">">https://portworx.com/products/portworx-data-services/.

Portworx Enterprise is the Complete Kubernetes Storage Platform Trusted in Production by the Global 2000 [online]. Portworx, Inc. 2021, 10 pages [Retrieved on Nov. 9, 2021]. Retrieved from the Internet: ">">https://portworx.com/products/portworx-enterprise/.

Production-Grade Container Orchestration [online]. Kubernetes, 2021, 6 pages [retrieved on Nov. 9, 2021]. Retrieved from the Internet: ">" title="Link: https://kubernetes.io/>">https://kubernetes.io/.

Sanglaji M., et al., "Nutanix Karbon: Enterprise-grade Kubernetes Solution," Nov. 28, 2018, 5 pages [online]. [retrieved on Nov. 9, 2021], Retrieved from the Internet: >https://www.nutanix.com/blog/nutanix-karbon-enterprise-grade-kubernetes-solution.

Screen Captures from YouTube Video Clip Entitled "Pure Storage Portworx Deep Dive," 5 pages, Uploaded on Nov. 6, 2020 by User "Tech Field Day". Retrieved from the Internet: >https://www.youtube.com/watch?v=WTCI98RAbZg.

Software Defined Storage (SDS) Solutions, [online]. Trustradius, 2021, 14 pages [Retrieved on Nov. 9, 2021], Retrieved from the Internet: ">" title ="Link: https://www.trustradius.com/software-defined-storage-sds>">https://www.trustradius.com/software-defined-storage-sds.

Software-defined Storage. [online] IBM, 2021, 12 pages [retrieved on Nov. 9, 2021], Retrieved from the Internet: ">">https://www.ibm.com/it-infrastructure/software-defined-storage.

Solution Brief. Easily Operate a Database-as-a-Service Platform. [online]. Portworx, Inc. 2021, 2 pages [retrieved on Nov. 9, 2021]. Retrieved from the Internet: ">">https://portworx.com/wp-content/uploads/2021/09/pds-solution-brief.pdf.

What Is Container Orchestration, Exactly? Everything to Know [online]. LaunchDarkly, Apr. 28, 2021, 8 pages [retrieved on Nov. 9, 2021] . Retrieved from the Internet: ">">https://launchdarkly.com/blog/what-is-container-orchestration-exactly-everything/.

What is Container Orchestration? [online]. CapitalOne, 2021, 8 pages [retrieved on Nov. 9, 2021], Retrieved from the Internet: ">" title="Link: https://www.capitalone.com/tech/cloud/what-is-container-orchestration/>">https://www.capitalone.com/tech/cloud/what-is-container-orchestration/.

Extended European Search Report for Application No. 22169485.4 dated Oct. 31, 2022, 8 pages.

Non-Final Office Action dated Mar. 15, 2023 for U.S. Appl. No. 17/849,290, filed Jun. 24, 2022, 6 pages.

U.S. Notice of Allowance dated Jun. 16, 2022 in U.S. Appl. No. 17/239,189.

* cited by examiner

1

CO-LOCATED JOURNALING AND DATA STORAGE FOR WRITE REQUESTS

CROSS-REFERENCE TO RELATED APPLICATIONS

This application is a continuation of U.S. patent application Ser. No. 17/239,189, filed Apr. 23, 2021, which is hereby incorporated by reference in its entirety for all purposes.

TECHNICAL FIELD

The present description relates to processing write requests in a distributed storage system, and more specifically, to methods and systems for co-locating the journaling of write requests and the storage of data associated with such write requests.

BACKGROUND

A distributed storage system typically includes various nodes or storage nodes that handle providing data access to clients. These nodes may handle, for example, write requests received from clients. A write request typically includes both data and metadata. A node may have a controller that processes the write request and manages storing the data and metadata in a file system. In one or more file systems, performing a write operation includes updating file data and file system metadata. For example, a file system may store data as well as metadata in files. Metadata may include, for example, inodes, block maps, other types of information about the data and/or the location at which the data in the write request is to be stored. Storing both data and metadata by, for example, writing both data and metadata to disk ensures consistency. Some currently available systems use journaling to batch metadata updates. Some currently available methods or systems, however, for journaling and writing data and metadata to disk may result in longer write latencies than desired.

BRIEF DESCRIPTION OF THE DRAWINGS

The present disclosure is best understood from the following detailed description when read with the accompanying figures.

Figure 1:
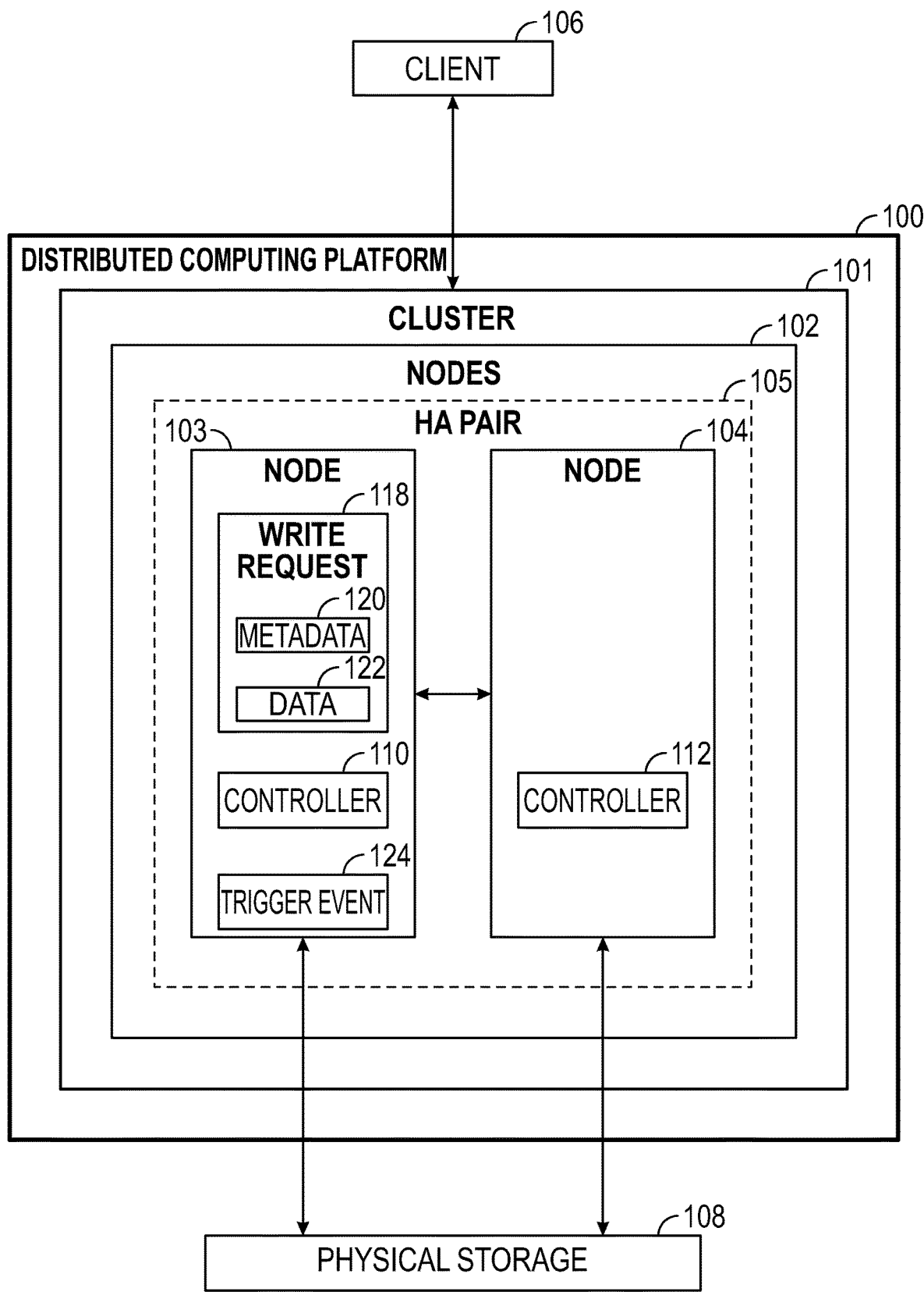
FIG. 1 is a schematic diagram illustrating an example of a distributed storage system in accordance with one or more embodiments.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

The embodiments described herein recognize and take into account that some currently available journaling methods and systems may result in longer write latencies than desired and may be inapplicable for virtual platforms. With some currently available methods of journaling, when a write request is received, the metadata (e.g., a fileid, block number, user data, etc.) and the data for the write request are added to in-memory buffers (e.g., NVRAM) as journal records. The metadata and data are not persisted to disk until a future point in time (e.g., a consistency point). If a node fails prior to a consistency point being reached, the journal records are replayed upon reboot.

Various embodiments described herein include methods and systems for co-locating the journaling of write requests and the storage of data associated with such write requests. This co-locating of journaling and data storage may be implemented in distributed storage systems that include one or more clusters, each cluster including one or more nodes or storage nodes. In one or more embodiments, write operation records that journalize write operations are co-located in a same logical storage unit in a node that contains (or corresponds to) the volume in which the data is to be written. In one or more embodiments, the logical storage unit is partitioned into a first partition, or journal partition, and a second partition, or volume partition. The journal partition may be a thin partition and the volume partition may be a thick partition.

The journal partition is used to log or "journal" write operation records (or write operation entries). For example, each write operation may be recorded as an entry or record in the journal partition. Each entry or record includes both the metadata and the data associated with the write operation. Adding or "journaling" a record to the journal partition includes storing both the metadata and the data in the journal partition. Storing the metadata and the data in the journal partition writes the metadata and the data to disk. Thus, in the various embodiments described herein, there is no latency with respect to when the metadata and/or data is written to disk. In the embodiments described herein, the metadata and data are added to the journal partition, and thereby written to disk, in a single input/output (I/O) operation.

Write operations can be recorded in the journal partition until a trigger event is detected. The trigger event may be, for example, the trigger for a consistency point. In response to detecting the trigger event, the metadata and the data in the journal partition are flushed to the volume partition. This flushing may include, for example, copying the data in the journal partition into respective blocks of the volume partition. The flushing may include, for example, storing a reference (e.g., hash value) for the data that is in the journal partition in the volume partition. Flushing may further include, for example, updating the metadata in the volume partition based on the metadata in the journal partition. Once the journal partition has been flushed, the journal partition may be overwritten with new write operation records.

The embodiments described herein recognize that when the underlying storage system is distributed, any node in a cluster can read or write to the logical storage unit in another node in the cluster. Accordingly, co-locating journaling of write requests and the storage of data associated with such write requests enables any node in the cluster to replay the journal partition of the logical storage unit associated with a particular node in the cluster in the event of that particular node failing (e.g., a failover event). These types of co-location and replay capabilities help ensure consistent and continuous or near-continuous data availability for client access. Additionally, using the same logical storage unit (e.g., logical unit number (LUN)) for journaling write requests and writing the data associated with such write requests helps prevent a bottleneck due to there being only a single device or storage unit handling all metadata for all write requests. For example, with 10 different logical storage units in a node, journaling can be happening on each of the 10 different logical storage units instead of journaling into a single logical storage unit.

Further, one or more of the embodiments described herein can reduce the time and/or processing resources associated with writing data. For example, when the underlying storage system supports deduplication, a trigger event may trigger copying a reference (e.g., hash value) for the data that is in the journal partition into the volume partition as compared to copying all of the data. The trigger event may further trigger updating metadata in the volume partition. Updating the metadata may include, for example, updating a super block in the volume partition. In one or more embodiments, by only needing to update the metadata and copy over the reference for the data (as opposed to copying over the data) in the volume partition, time and/or processing resource savings may be realized.

FIG. 1 is a schematic diagram illustrating an example of a distributed storage system 100 in accordance with one or more embodiments. In one or more embodiments, distributed storage system 100 is implemented at least partially virtually. Distributed storage system 100 includes cluster 101. Cluster 101 includes a plurality of nodes 102. In one or more embodiments, nodes 102 include two or more nodes. In other embodiments, nodes 102 include at least four nodes. Examples of different ways in which cluster 101 of nodes 102 may be implemented are described in further detail in FIGS. 8-9 below. Further, examples of how a distributed storage system 100 may be used with a distributed computing platform are described in further detail in FIGS. 8-9 below.

Nodes 102 include node 103 and node 104. In one or more embodiments, node 103 and node 104 form high-availability (HA) pair 105 of nodes within cluster 101. For example, node 103 may be a first node in HA pair 105 that services read requests, write requests, or both received from one or more clients such as, for example, client 106. Node 104 may be a second node in HA pair 105 that services read requests, write requests, or both received from one or more clients such as, for example, client 106. In one or more embodiments, node 103 or node 104 may serve as a backup node for the other should the former experience a failover event.

Nodes 102 are supported by physical storage 108. In one or more embodiments, at least a portion of physical storage 108 is distributed across nodes 102. Node 103 and node 104 connect with physical storage 108 via controller 110 and controller 112, respectively. Each of controller 110 and controller 112 may be implemented using hardware, software, firmware, or a combination thereof. In one or more embodiments, controller 110 is implemented in an operating system within node 103 and controller 112 is implemented within an operating system within node 104. The operating system may be, for example, a storage operating system that is hosted by distributed storage system 100 or a distributed computing platform in communication with distributed storage system 100, may be installed in node 103, node 104, both, or one or more other nodes in cluster 101. Physical storage 108 may be comprised of any number of physical data storage devices. For example, without limitation, physical storage 108 may include disks or arrays of disks, solid state drives (SSDs), flash memory, one or more other forms of data storage, or a combination thereof.

In some embodiments, node 103 and node 104 connect with or share a common portion of physical storage 108. In other embodiments, node 103 and node 104 do not share storage. For example, node 103 may read from and write to a first portion of physical storage 108, which may be storage 114, while node 104 may read from and write to a second portion of physical storage 108, which may be storage 116.

Should node 103 experience a failover event, node 104 can take over data services (e.g., reads, writes, etc.) for node 103. In one or more embodiments, this takeover includes taking over a portion of physical storage 108 originally assigned to node 103 or providing data services (e.g., reads, writes) from another portion of physical storage 108, which may include a mirror or copy of the data stored in portion of physical storage 108 assigned to node 103. In some cases, this takeover may last only until node 103 returns to being functional, online, or otherwise available.

Node 103 and node 104 both use logging or journaling of incoming write requests to provide efficiencies in the way such write requests are serviced. For example, client 106 may generate and send write request 118 to distributed storage system 100. Write request 118 is serviced by HA pair 105. In one or more embodiments, write request 118 is serviced by controller 110 of node 103. Write request 118 includes metadata 120 and data 122. Controller 110 logs metadata 120 and data 122 as part of a single I/O operation such that a reply confirming handling of write request 118 can be sent (e.g., immediately, soon thereafter, etc.) to client 106.

Controller 110 logs any number of write requests until controller 110 detects trigger event 124. Trigger event 124 may be any event that signals a transfer of write request metadata to a volume within node 103. In one or more embodiments, trigger event 124 is an event that triggers a "consistency point." For example, when node 103 detects trigger event 124, node 103 flushes its log of write requests.

Figure 2:
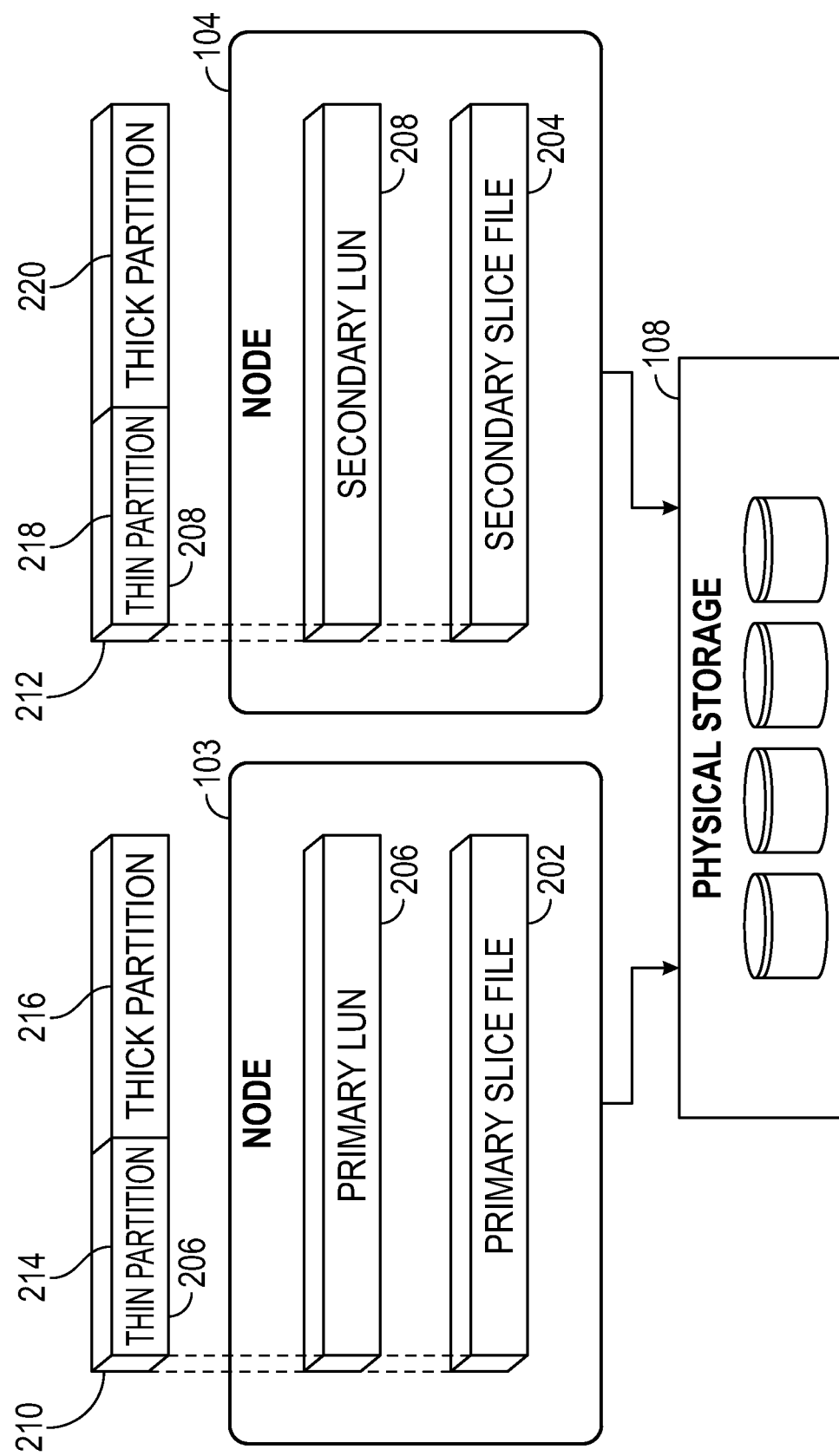
FIG. 2 is a schematic diagram illustrating additional example details with respect to nodes in accordance with one or more embodiments.

FIG. 2 is a schematic diagram illustrating additional example details with respect to node 103 and node 104 in FIG. 1 in accordance with one or more embodiments. In one or more embodiments, primary slice file 202 is accessible by node 103 and secondary slice file 204 is accessible by node 104. Primary slice file 202 and secondary slice file 204 each identify one or more slices.

A slice is derived from one or more storage devices within physical storage 108 and provides building blocks from which logical storage units can be built. The one or more storage devices may include non-volatile storage devices such as, for example, without limitation, solid state drives, disk arrays, etc. In some embodiments, slices are provided in fixed sizes (e.g., 1 gigabyte (GB), 256 megabytes (MB), etc.). In other embodiments, slices may be variable in size. A slice file, such as primary slice file 202 or secondary slice file 204, identifies the one or more block identifiers ("block id") corresponding to each of one or more slices. For example, primary slice file 202 may identify a single slice and the corresponding one or more logical block addresses (LBAs) of the one or more blocks included in that slice. The LBA identification may be via, for example, hash values for the block ids of the corresponding LBAs. In other examples, primary slice file 202 identifies a plurality of slices and the corresponding one or more LBAs of the one or more blocks included in each slice of the plurality of slices. In one or more embodiments, secondary slice file 204 identifies the same one or more slices identified by primary slice file 202 such that node 103 and node 104 share the same portion of physical storage 108. In other embodiments, secondary slice file 204 and primary slice file 202 identify different slices.

In one or more embodiments, one or more slices identified or otherwise mapped by primary slice file 202 are presented to node 103 as primary logical storage unit 206. Similarly, one or more slices identified or otherwise mapped by secondary slice file 204 are presented to node 104 as secondary logical storage unit 208. In various embodiments, primary logical storage unit 206 and secondary logical storage unit 208 each take the form of, for example, without limitation, a logical unit number (LUN). Because node 103 and node 104 form HA pair 105, as described in FIG. 1, write operations in which data is stored in primary logical storage unit 206 are mirrored such that the data is similarly stored in secondary logical storage unit 208.

Primary logical storage unit 206 and secondary logical storage unit 208 are configured for co-located storage of write operation journal records and data. For example, primary logical storage unit 206 is partitioned (or divided) into plurality of partitions 210 and secondary logical storage unit 208 is partitioned (or divided) into plurality of partitions 212.

Plurality of partitions 210 includes at least a first partition, journal partition 214, and volume partition 216. In some embodiments, journal partition 214 is implemented as a thin partition, while volume partition 216 is implemented as a thick partition. Journal partition 214 is used to journal write operation records. These write operation records are non-volatile log records that may, in some cases, be referred to as nv log records. Volume partition 216 is used by at least one volume. In one or more embodiments, volume partition 216 is used by a single volume such as, for example, without limitation, a Flexible Volume (FlexVol®). In one or more embodiments, the volume is a file system that is located on an aggregate and may be distributed across the various storage devices (e.g., disks) of the aggregate. The file system may be, for example, without limitation, the Write Anywhere File Layout (WAFL®) file system.

Plurality of partitions 212 includes at least a first partition, journal partition 218, and a second partition, volume partition 220. In some embodiments, journal partition 218 is implemented as a thin partition, while volume partition 220 is implemented as a thick partition. In one or more embodiments, journal partition 218 and volume partition 220 are implemented in a manner similar to that described above for journal partition 214 and volume partition 216, respectively.

Figure 3:
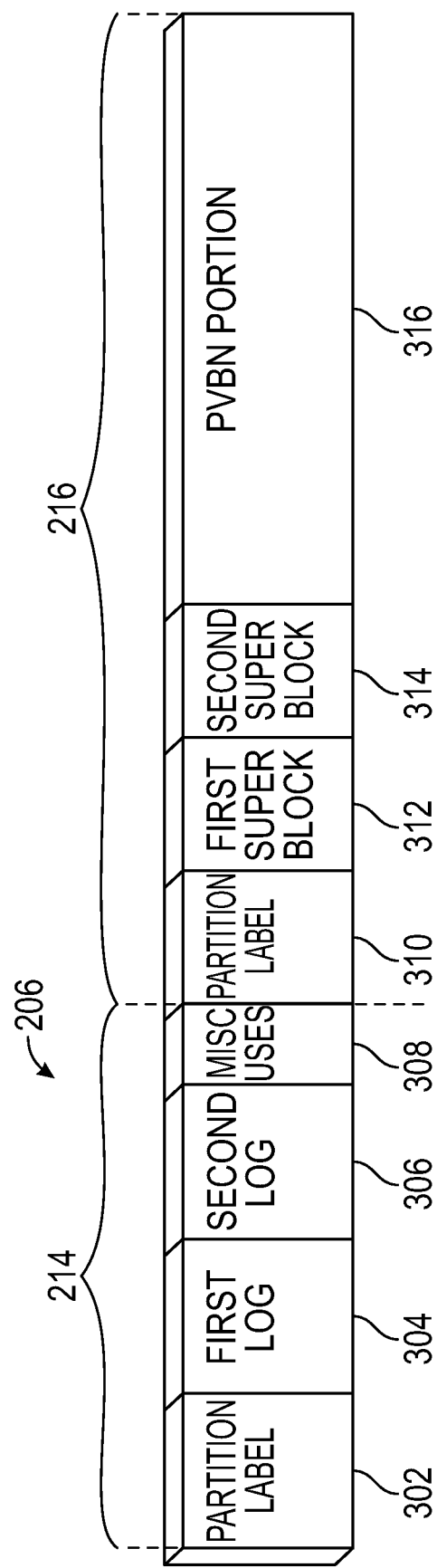
FIG. 3 is a schematic diagram illustrating an example of a configuration for a primary logical storage unit in accordance with one or more embodiments.

FIG. 3 is a schematic diagram illustrating an example of a configuration for primary logical storage unit 206 from FIG. 2 in accordance with one or more embodiments. Journal partition 214 includes partition label portion 302, first log 304, second log 306, and miscellaneous portion 308. Partition label portion 302 includes one or more partition labels and identifies journal partition 214 as being the partition to be used for journaling write requests. In one or more embodiments, partition label portion 302 includes an identification of an offset starting location for journal partition 214. For example, partition label portion 302 may identify the offset count for the LBA of primary logical storage unit 206 at which journal partition 214 begins. First log 304 and second log 306 are both used to contain the write operation records. In one or more embodiments, only one of first log 304 and second log 306 is active with respect to tracking (or journaling) write operation records at a given point in time.

For example, when first log 304 is active (or in an active state), second log 306 may be considered inactive (or in an inactive or hold state). First log 304 may become inactive (or switch to the inactive or hold state) in response to a trigger event, such as trigger event 124 (e.g., a trigger for a consistency point). When first log 304 becomes inactive, second log 306 becomes active (or switches to the active state).

Volume partition 216 uses a file system, which, as described above, may be, for example, without limitation, a WAFL® file system. Volume partition 216 includes partition label portion 310, first super block 312, second super block 314, and physical volume block number (PVBN) portion 316. Partition label portion 310 includes one or more partition labels and identifies volume partition 216 as being the partition representing the volume. In one or more embodiments, partition label portion 310 includes an identification of an offset starting location for volume partition 216. For example, partition label portion 310 may identify the offset count for the logical block address (LBA) of primary logical storage unit 206 at which volume partition 216 begins. In one or more embodiments, the LBAs of journal partition 214 are a contiguous set of LBAs with volume partition 216 beginning at some LBA after journal partition 214. Partition label portion 310 may identify the beginning LBA for volume partition 216.

In one or more embodiments, first super block 312 and second super block 314 contain metadata associated with the file system of volume partition 216. In one or more embodiments, first super block 312 is the portion of volume partition 216 in which metadata recorded in first log 304 is stored via updating. In one or more embodiments, second super block 314 is the portion of volume partition 216 in which metadata recorded in second log 306 is stored or updated. PVBN portion 316 is the portion of volume partition 216 into which data recorded in both first log 304 and second log 306 is stored. In some embodiments, first super block 312 and second super block 314 the root blocks of the file system.

Figure 4:
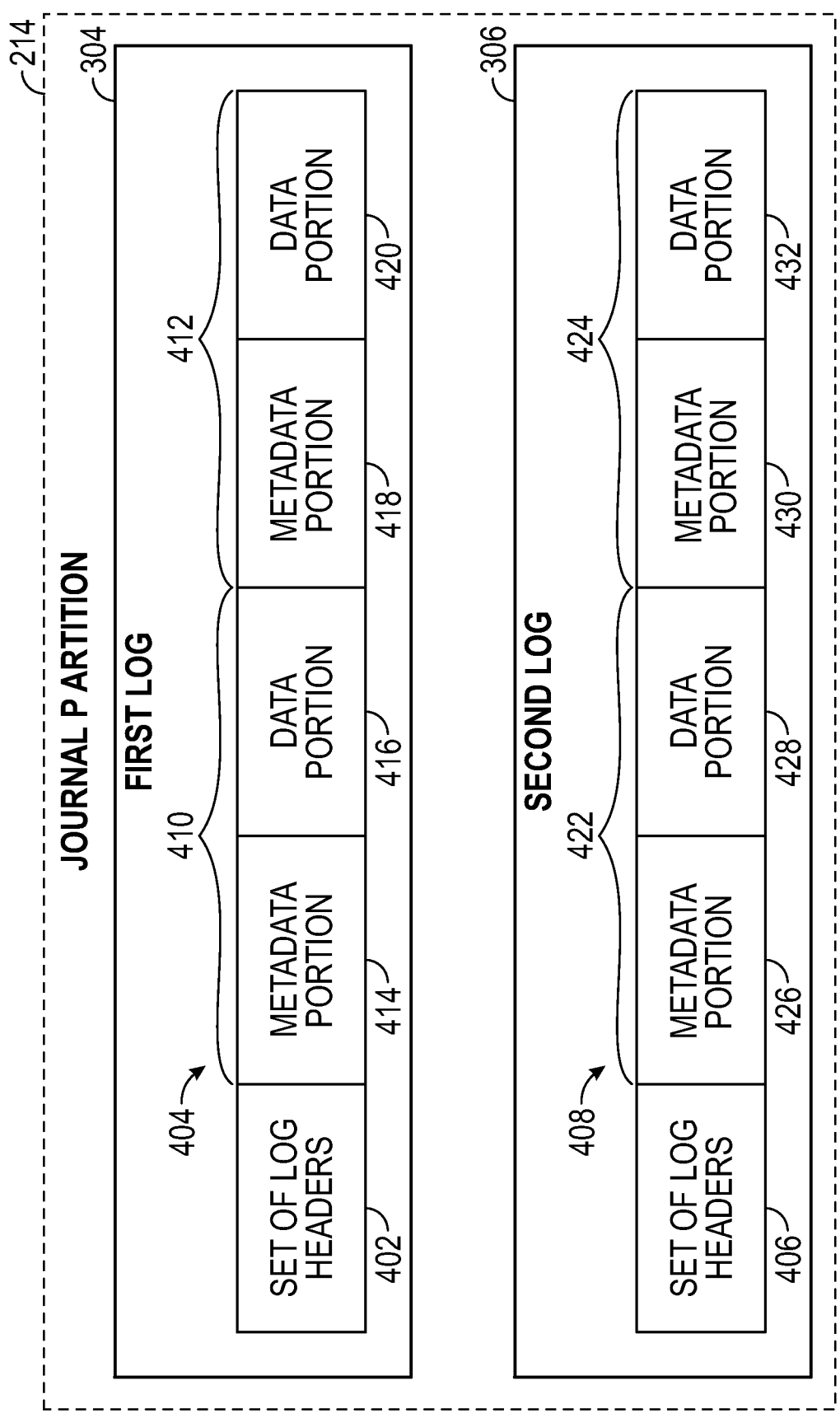
FIG. 4 is a schematic diagram illustrating an example of a configuration for a journal partition in accordance with one or more embodiments.

FIG. 4 is a schematic diagram illustrating an example of a configuration for journal partition 214 from FIGS. 2-3 in accordance with one or more embodiments. As previously described above, journal partition 214 includes first log 304 and second log 306. First log 304 includes set of log headers 402 and plurality of records 404. Set of log headers 402 may include one or more log headers. In FIG. 4, set of log headers 402 includes a single log header. Plurality of records 404 may include two or more records (e.g., up to N records). Second log 306 includes set of log headers 406 and plurality of records 408. Set of log headers 406 may include one or more log headers. In FIG. 4, set of log headers 406 includes a single log header. Plurality of records 408 may include two or more records (e.g., up to N records).

In one or more embodiments, set of log headers 402 and set of log headers 406 each includes information about their respective logs. For example, set of log headers 402 may include a version identification, a trigger event counter, a consistency point counter, a spare counter, or a combination thereof. Set of log headers 402 may include, for example, a version identification, a trigger event counter, a consistency point counter, a spare counter, or a combination thereof. A trigger event counter may count the number of times a trigger event has been detected while that log has been active. A consistency point counter may count the number of times a consistency point has been reached. A spare counter may count, for example, without limitation, a number of empty records and/or a number of previously flushed records within the log.

In one or more embodiments, each of plurality of records 404 and each of plurality of records 408 is sized equally. In some embodiments, each of plurality of records 404 and each of plurality of records 408 comprises two 4 kilobyte (4 KB) blocks, with a first of the 4 KB blocks being used for metadata and a second of the 4 KB blocks being used for data. In other embodiments, plurality of records 404 and plurality of records 408 may be variably sized.

Each record of plurality of records 404 and each record of plurality of records 408 includes a metadata portion and a data portion. For example, plurality of records 404 includes at least record 410 and record 412. Record 410 includes metadata portion 414 and data portion 416. Record 412 includes metadata portion 418 and data portion 420. Plurality of records 408 includes at least record 422 and record 424. Record 422 includes metadata portion 426 and data portion 428. Record 424 includes metadata portion 430 and data portion 432.

In various embodiments, plurality of records 404 and plurality of records 408 are capable of being filled. An empty record is one that does not contain any data (e.g., contains only zeroes) within the metadata and data portions of the record. A filled record is a record that contains a write operation record. For example, a filled record has an entry in the metadata portion and the data portion of the record. A filled record may be a newly filled record or a flushed record. A flushed record is a record in which the data and metadata within the record have been flushed such that the record can be overwritten. A newly filled record is a record in which the data and metadata have not yet been flushed.

In one or more embodiments, journal partition 214 is 4 KB aligned. The metadata portions (e.g., 414, 418, 426, and 430) of journal partition 214 may each include at least one 4 KB block. When metadata (e.g., a write header) is written into a metadata portion of a record, the metadata may require fewer bytes than 4 KB. Accordingly, the remaining unused portion of the metadata portion may be padded with zeroes. The data portions (e.g., 416, 420, 428, and 432) of journal partition 214 may each include one or more 4 KB blocks. For example, if a write request includes 64 KB of data, the data portion storing that data may include sixteen 4 KB blocks. Keeping the metadata portions in separate 4 KB blocks from the data portions may help prevent issues associated with deduplication via the underlying storage system (e.g., when deduplication in underlying storage system is 4 KB block based).

Figure 5:
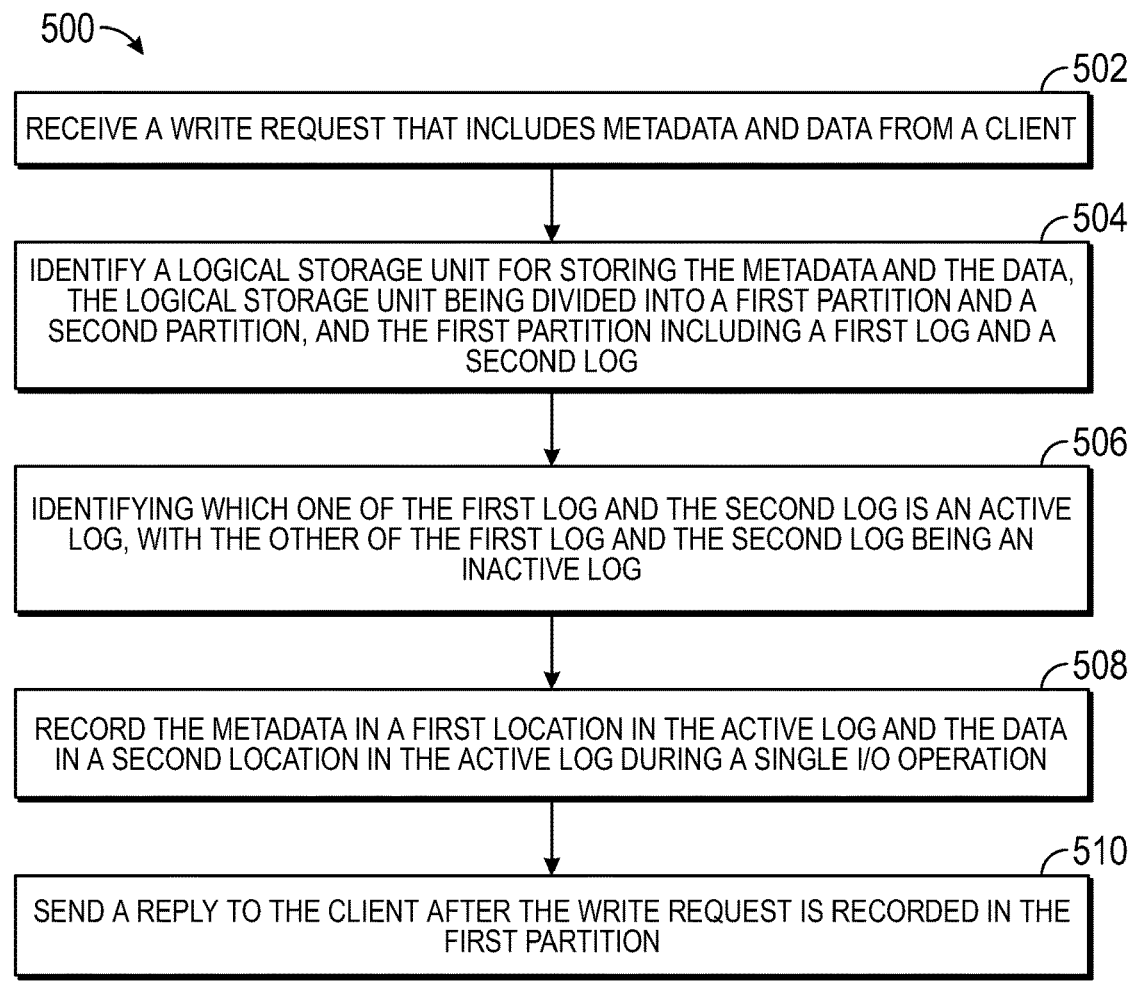
FIG. 5 is a flow diagram illustrating examples of operations in a process for co-locating journaling and data storage based on write requests in accordance with one or more embodiments.

FIG. 5 is a flow diagram illustrating examples of operations in a process 500 for co-locating journaling and data storage based on write requests in accordance with one or more embodiments. It is understood that additional actions or operations can be provided before, during, or after the actions or operations of process 500, and that some of the actions or operations described can be replaced or eliminated in other embodiments of the process 500. Still further, in some embodiments, one or more of the operations of process 500 may be performed simultaneously or integrated in some other manner.

Process 500 may be implemented using, for example, without limitation, distributed storage system 100 in FIG. 1. In one or more embodiments, process 500 may be implemented by a node, such as one of nodes 102 in FIG. 1. For example, process 500 may be implemented by a first node of a HA pair, such as, for example, node 103 of HA pair 105 in FIG. 1. In one or more embodiments, process 500 is at least partially implemented by the controller of a node, such as, for example, controller 110 of node 103 in FIG. 1.

Process 500 begins by receiving a write request that includes metadata and data from a client (operation 502). In one or more embodiments, this write request is a transformed version of an original write request received directly from the client. For example, the original write request received from the client may be modified or transformed via one or more different protocols to form the write request received in operation 502. In other embodiments, this write request is a request in the form directly received from the client.

Next, a logical storage unit is identified for storing the metadata and the data, the logical storage unit being divided into a journal partition and a volume partition, and the journal partition including both a first log and a second log (operation 504). The logical storage unit may be presented as a single logical unit to the node but may be represented or otherwise supported by any number of physical data storage devices (e.g., disks, disk arrays). In one or more embodiments, the logical storage unit is primary logical storage unit 206 in FIG. 2. The logical storage unit may be, for example, a LUN (e.g., a virtual LUN). The journal partition and the volume partition may be, for example, without limitation, journal partition 214 and volume partition 216, respectively, in FIG. 2. Further, the first log and the second log may be, for example, without limitation, first log 304 and second log 306 in FIG. 3.

The volume partition of the LUN represents a volume on that LUN. In one or more embodiments, this volume takes the form of a Flexible Volume (FlexVol®). In one or more embodiments, the volume is a file system on the LUN that is located on an aggregate and may be distributed across the various storage devices (e.g., disks) of the aggregate. The file system may be, for example, without limitation, the Write Anywhere File Layout (WAFL®) file system.

Thereafter, which one of the first log and the second log is an active log is identified, with the other of the first log and the second log being an inactive log (operation 506). For example, only one of the first log and the second log may be active (e.g., in an active state as opposed to a hold state) at a time. The one of the first log and the second log that is active, the active log, is used for journaling write requests. The other of the first log and the second log, the inactive log, is on hold or "frozen" until the active log is switched to being inactive. An active log may be switched to inactive in response to, for example, a trigger event (e.g., a trigger for a consistency point). One example of a manner in which a node handles a consistency point is described further below in FIG. 6.

The write request is journaled in the active log by recording the metadata in a first location in the active log and the data in a second location in the active log during a single I/O operation (operation 508). In one or more embodiments, the first location and the second location are adjacent 4 KB portions of the journal partition of the LUN. Performing this recording in a single I/O operation ensures consistency. In one or more embodiments, recording the data in the second location in operation 508 includes writing the data to disk. The first location and the second location may be or be associated with, for example, LBAs.

A reply is sent to the client after the write request is recorded in the journal partition (operation 510). The reply in operation 510 confirms that the write request has been handled. Sending the reply to the client after journaling, but before the data from the write request has been added to the volume of the volume partition helps reduce write latency.

Figure 6:
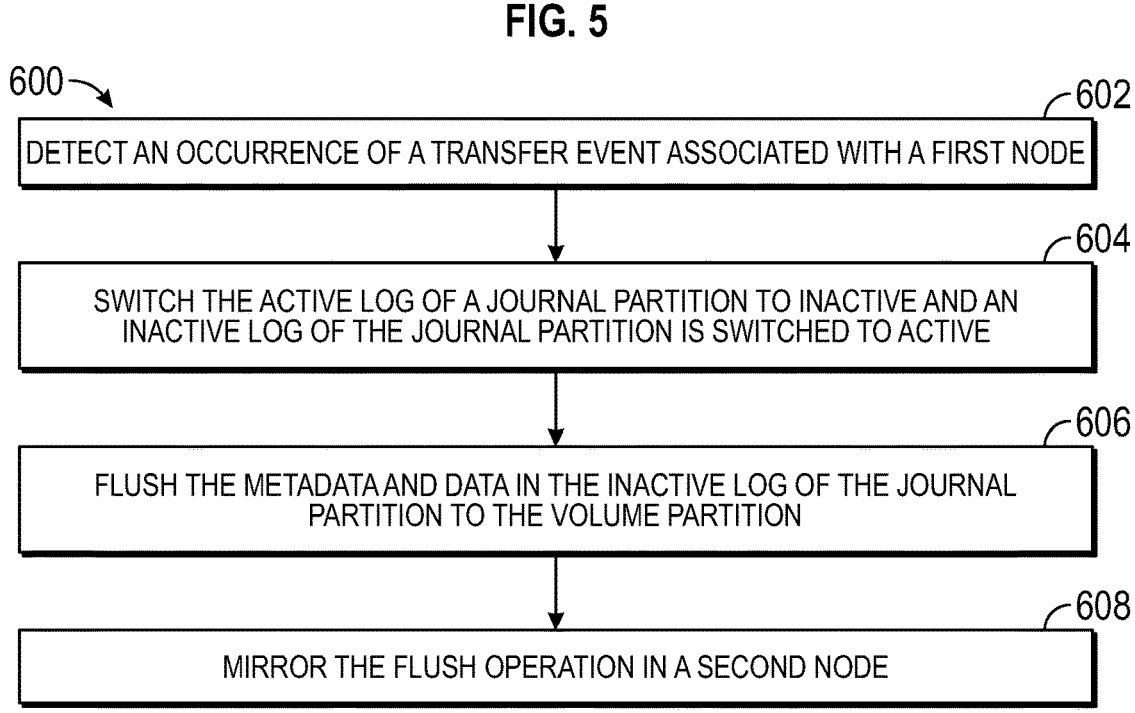
FIG. 6 is a flow diagram illustrating examples of operations in a process for flushing a journal partition of a logical storage unit in accordance with one or more embodiments.

FIG. 6 is a flow diagram illustrating examples of operations in a process 600 for flushing a journal partition of a logical storage unit in accordance with one or more embodiments. It is understood that additional actions or operations can be provided before, during, or after the actions or operations of process 600, and that some of the actions or operations described can be replaced or eliminated in other embodiments of the process 600. Still further, in some embodiments, one or more of the operations of process 600 may be performed simultaneously or integrated in some other manner.

Process 600 may be implemented using, for example, without limitation, distributed storage system 100 in FIG. 1. In one or more embodiments, process 600 may be implemented by a node, such as one of nodes 102 in FIG. 1. For example, process 600 may be implemented by a first node of a HA pair, such as, for example, node 103 of HA pair 105 in FIG. 1. In one or more embodiments, process 600 is at least partially implemented by the controller of a node, such as, for example, controller 110 of node 103 in FIG. 1. In one or more embodiments, process 600 is one example of a manner in which the records added to the journal partition in process 500 in FIG. 5 may be flushed in response to a trigger event.

The process 600 begins by detecting an occurrence of a trigger event associated with a first node (operation 602). The first node is one of a HA pair of nodes. The trigger event may be, for example, without limitation, a trigger for a consistency point. The consistency point may be detected in various ways. In one or more embodiments, the trigger event is the number of records journaled in an active log of a journal partition reaches a selected threshold (e.g., a maximum number of records allowed for the log, a number of records one or two below the maximum number of records allowed for the log, etc.). In some embodiments, the trigger event includes a lapse of a timer (e.g., a timer set for 5 seconds, 10 seconds, 15 seconds, or some other period of time), a snapshot operation, receipt of a command requesting a consistency point, an internal sync operation, some other type of event, or a combination thereof.

Next, a first log of a journal partition that is in an active state is switched to an inactive state and a second log of the journal partition that is in the inactive state is switched to an active state (operation 604). In operation 604, the first log switches from being an active log to an inactive log and the second log switches from being an inactive log to an active log. Switching the first log to the inactive state freezes the first log such that no other write operation records can be journaled into the first log. Further, switching the second log to the active state unfreezes the second log such that new write operation records can be journaled into the second log. This freezing of the first log and unfreezing of the second log allows the metadata and data recorded in the first log to be flushed without causing any delays in the servicing of incoming or future write requests.

The metadata and the data in the first log of the journal partition are flushed to the volume partition (operation 606). Operation 606 may be performed in various ways. In one or more embodiments, a record in the first log is flushed to the volume partition by copying the metadata and the data in the record into appropriate locations of the volume partition. In some cases, the super block (or root block) of the volume corresponding to the first log is updated with the location of the metadata. In one or more embodiments, the super block is also updated with additional information (e.g., file system information). The data in the record is copied from its location in the log into a new location in the volume partition. For example, the data may be associated with a first LBA of the journal partition and may be copied into a second LBA of the volume partition. In some cases, this data copying operation is initiated via an iSCSI (Internet Small Computer Systems Interface) command (e.g., XCopy).

In other embodiments, a record in the first log is flushed to the volume partition using hashing. For example, the underlying storage system may be a content addressable storage system. For example, for each LBA written to in the journal partition, a cryptographic hash value (e.g., skein hash) of that data (e.g., metadata or write request data) is generated and a map of that LBA to the hash value is stored. This type of content addressable storage system enables deduplication (e.g., global dedupe) since identical data (e.g., identical 4 KB data writes) will share the same hash value. With these types of systems, the record may be flushed by sending a remote procedure call (RPC) that tells the controller of the node to store the hash value of the data in the record in the journal partition in association with the new LBA in the volume partition. The file system of the volume partition updates a map file, which, for example, maps LBAs to blockids, indicating that the LBA in the volume partition has the hash value.

The flush operation may be mirrored in a second node (operation 608). For example, operation 606 may be mirrored in the second node of the HA pair of nodes. This mirroring ensures consistency and data protection in the event of a failover vent.

Figure 7:
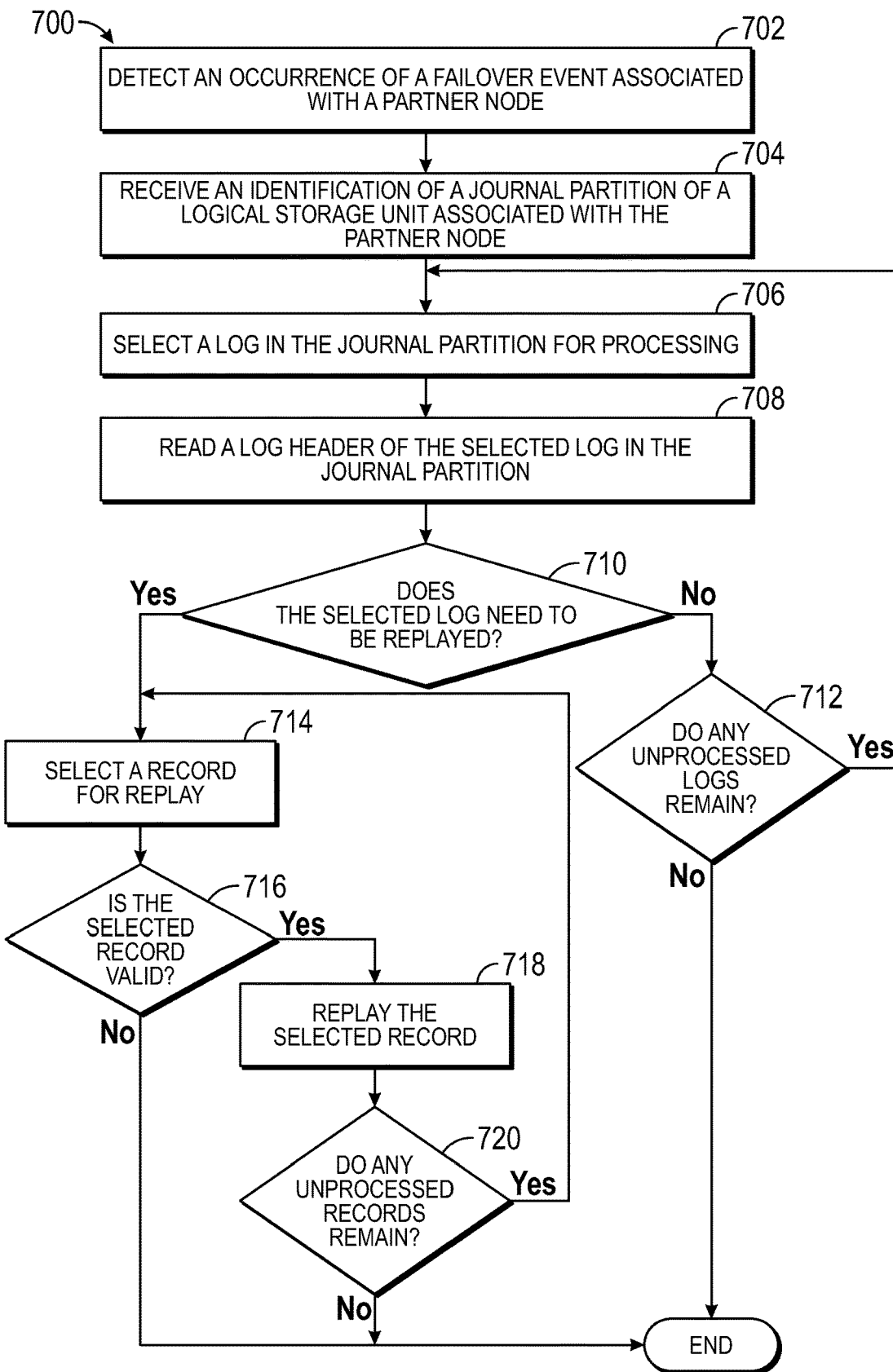
FIG. 7 is a flow diagram illustrating examples of operations in a process for handling a failover event in accordance with one or more embodiments.

FIG. 7 is a flow diagram illustrating examples of operations in a process 700 for handling a failover event in accordance with one or more embodiments. It is understood that additional actions or operations can be provided before, during, or after the actions or operations of process 700, and that some of the actions or operations described can be replaced or eliminated in other embodiments of the process 700. Still further, in some embodiments, one or more of the operations of process 700 may be performed simultaneously or integrated in some other manner.

Process 700 may be implemented using, for example, without limitation, distributed storage system 100 in FIG. 1. In one or more embodiments, process 700 may be implemented by a node, such as one of nodes 102 in FIG. 1. For example, process 700 may be implemented by a second node of a HA pair, such as, for example, node 104 of HA pair 105 in FIG. 1. In one or more embodiments, process 700 is at least partially implemented by the controller of a node, such as, for example, controller 112 of node 104 in FIG. 1. In one or more embodiments, process 700 is one example of a manner in which the node 104 may bring primary logical storage unit 206 in FIG. 2 of node 103 online in response to a failover event associated with node 103.

Process 700 begins with detecting an occurrence of a failover event associated with a partner node (operation 702). For example, a node, such as node 104 in FIG. 1, may detect that its partner node, which may be node 103 in FIG. 1, has failed. In this example, node 104 is the surviving node.

An identification of a journal partition of a logical storage unit associated with the partner node is received (operation 704). The logical storage unit may be, for example, a LUN. A log in the journal partition is selected for processing (operation 706). In one or more embodiments, the journal partition includes two logs. In other embodiments, the journal partition includes more than two logs. A log header of the selected log in the journal partition is read (operation 708). In other embodiments, operation 708 may include reading more than one log header of the selected log.

A determination is made as to whether the selected log needs to be replayed (operation 710). Operation 710 may be performed by, for example, using a trigger event counter, a consistency point counter, or both of the selected log. If the log does not need to be replayed, a determination is made as to whether any unprocessed logs remain (operation 712). If any unprocessed logs remain in the journal partition, process 700 returns to operation 706 described above. Otherwise, process 700 terminates.

With respect again to operation 710, if the selected log needs to be replayed, a record is selected for replay (operation 714). A determination is then made as to whether the selected record is valid (operation 716). In one or more embodiments, operation 716 may be performed by checking the metadata portion of the selected record. If the metadata in the metadata portion includes a valid cryptographic hash value for the data, this hash value may be used to determine if the metadata (e.g., write header) is valid. If the metadata is valid, the data portion of the record is checked to determine if the data is valid. For example, the cryptographic hash value stored in the metadata portion may be compared to the data to see if the hash value matches the data. If there is no match, the selected record is invalid. If there is a match, the selected record is valid.

With respect to operation 716, if the selected record is not valid, process 700 terminates. Otherwise, the record is replayed (operation 718). Thereafter, a determination is made as to whether any unprocessed records remain (operation 720). If any unprocessed records remain, process 700 returns to operation 715 described above. Otherwise, process 700 terminates.

Figure 8:
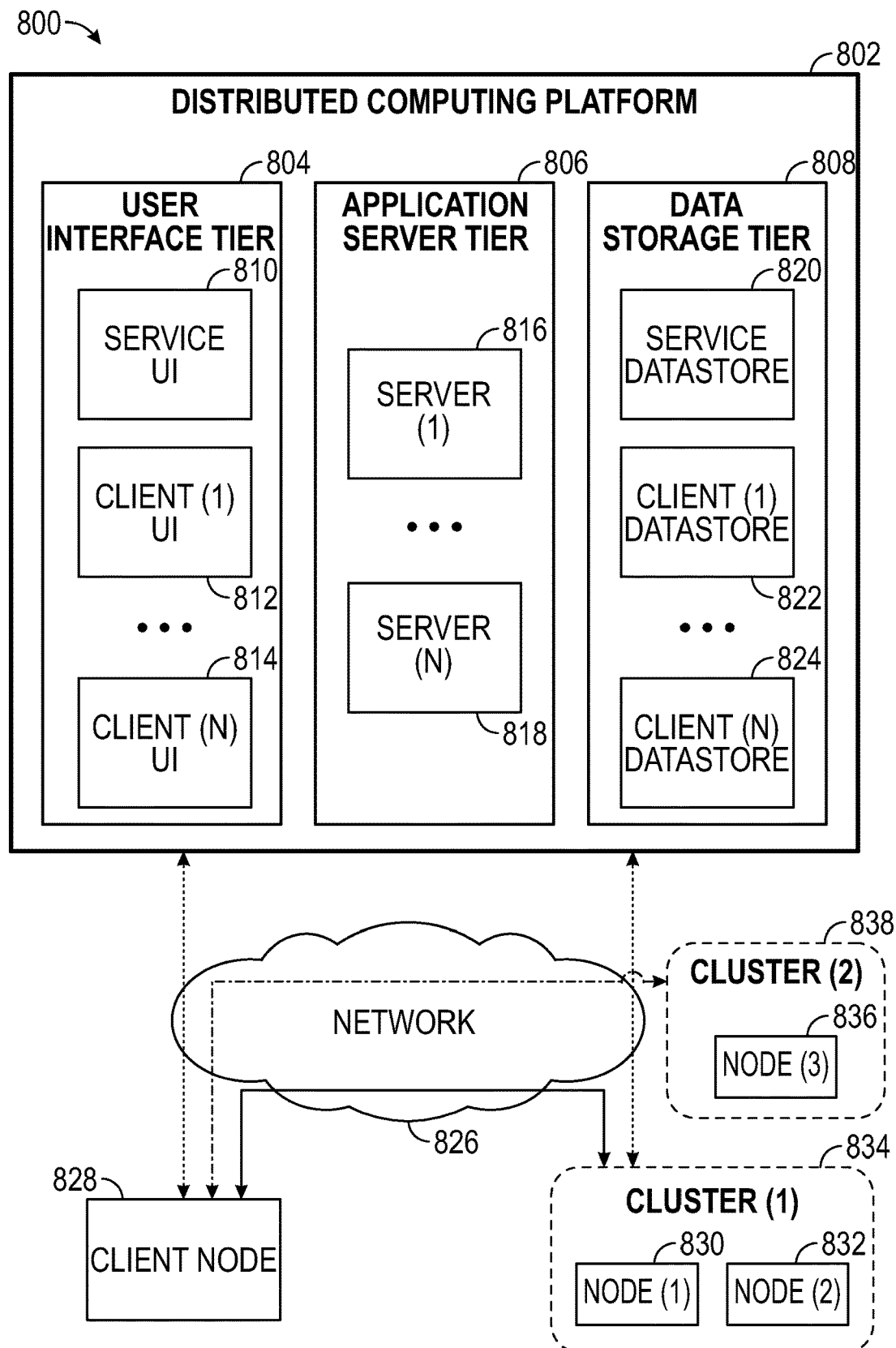
FIG. 8 is a schematic diagram illustrating an example of a computing environment in accordance with one or more embodiments.

FIG. 8 is a schematic diagram illustrating an example of a computing environment 800 in accordance with one or more embodiments. Various embodiments described herein may include actions (e.g., actions by controller 110 or controller 112 in FIG. 1) implemented within one or more nodes, such as first node 830 and/or second node 832 within first cluster 834, third node 836 within second cluster 838, or some other combination of nodes. For example, cluster 101 in FIG. 1 may be implemented in a manner similar to cluster 834 in FIG. 8. As another example, node 103 and node 103 in FIG. 1 may be implemented in a manner similar to first node 830 and second node 832, respectively.

A node may comprise a storage controller, a server, an on-premise device, a virtual machine such as a storage virtual machine, hardware, software, or combination thereof. The one or more nodes may be configured to manage the storage and access to data on behalf of client node 828 and/or other client devices. The various embodiments described herein may be implemented within and/or in conjunction with distributed computing platform 802, which may take the form of, for example, a cloud computing environment (e.g., a cloud storage environment, a multi-tenant platform, a hyperscale infrastructure comprising scalable server architectures and virtual networking, etc.). Distributed computing platform 802 is configured to manage the storage and access to data on behalf of client devices and/or nodes.

In yet another example, at least some of the techniques described herein include actions implemented by or in response to actions by one or more of client node 828, the one or more nodes 830, 832, and/or 836, and/or distributed computing platform 802. For example, client node 828 may transmit operations, such as data operations to read data and write data and metadata operations (e.g., a create file operation, a rename directory operation, a resize operation, a set attribute operation, etc.), over a network 826 to first node 830 for implementation by first node 830 upon storage. First node 830 may store data associated with the operations within volumes or other data objects/structures hosted within locally attached storage, remote storage hosted by other computing devices accessible over the network 826, storage provided by distributed computing platform 802, etc. First node 830 may replicate the data and/or the operations to other computing devices, such as to second node 832, the third node 836, a storage virtual machine executing within distributed computing platform 802, etc., so that one or more replicas of the data are maintained. For example, the third node 836 may host a destination storage volume that is maintained as a replica of a source storage volume of first node 830. Such replicas can be used for disaster recovery and failover.

In an embodiment, the techniques described herein include actions implemented by a storage operating system or are implemented by a separate module that interacts with the storage operating system. The storage operating system may be hosted by client node 828, distributed computing platform 802, or across a combination thereof. In an example, the storage operating system may execute within a storage virtual machine, a hyperscaler, or some other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by first node 830, a cloud object stored by distributed computing platform 802, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write-anywhere file layout file system for a volume where modified data for a file may be written to any available location as opposed to a write-in-place architecture where modified data is written to the original location, thereby overwriting the previous data. In one or more embodiments, the file system may be implemented through a file system layer that stores data of the storage objects in an on-disk format representation that is block-based (e.g., data is stored within 4 KB blocks, and inodes are used to identify files and file attributes such as creation time, access permissions, size and block location, etc.).

In one or more embodiments, deduplication may be implemented by a deduplication module associated with the storage operating system to improve storage efficiency. For example, inline deduplication may ensure blocks are deduplicated before being written to a storage device. Inline deduplication uses a data structure, such as an in-core hash store, which maps fingerprints of data-to-data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In one or more embodiments, various types of synchronization may be implemented by a synchronization module associated with the storage operating system. In some embodiments, synchronous replication may be implemented, such as between first node 830 and second node 832. It may be appreciated that the synchronization module may implement synchronous replication between any devices within the computing environment 800, such as between first node 830 of first cluster 834 and the third node 836 of second cluster 838 and/or between a node of a cluster and an instance of a node or virtual machine in distributed computing platform 802.

For example, without limitation, during synchronous replication, first node 830 may receive a write operation from client node 828. The write operation may target a file stored within a volume managed by first node 830. First node 830 replicates the write operation to create a replicated write operation. First node 830 locally implements the write operation upon the file within the volume. First node 830 also transmits the replicated write operation to a synchronous replication target, such as second node 832 that maintains a replica volume as a replica of the volume maintained by first node 830. Second node 832 will execute the replicated write operation upon the replica volume so that the file within the volume and the replica volume comprises the same data. After, second node 832 will transmit a success message to first node 830. With synchronous replication, first node 830 does not respond with a success message to client node 828 for the write operation until the write operation is executed upon the volume and first node 830 receives the success message that second node 832 executed the replicated write operation upon the replica volume.

In another example, asynchronous replication may be implemented, such as between first node 830 and third node 836. It may be appreciated that the synchronization module may implement asynchronous replication between any devices within the computing environment 800, such as between first node 830 of first cluster 834 and distributed computing platform 802. In an example, first node 830 may establish an asynchronous replication relationship with the third node 836. First node 830 may capture a baseline snapshot of a first volume as a point in time representation of the first volume. First node 830 may utilize the baseline snapshot to perform a baseline transfer of the data within the first volume to the third node 836 in order to create a second volume within the third node 836 comprising data of the first volume as of the point in time at which the baseline snapshot was created.

After the baseline transfer, first node 830 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, first node 830 may store data or a portion thereof within storage hosted by distributed computing platform 802 by transmitting the data within objects to distributed computing platform 802. In one example, first node 830 may locally store frequently accessed data within locally attached storage. Less frequently accessed data may be transmitted to distributed computing platform 802 for storage within data storage tier 808. Data storage tier 808 may store data within a service data store 820. Further, data storage tier 808 may store client specific data within client data stores assigned to such clients such as a client (1) data store 822 used to store data of a client (1) and a client (N) data store 824 used to store data of a client (N). The data stores may be physical storage devices or may be defined as logical storage, such as a virtual volume, logical unit numbers (LUNs), or other logical organizations of data that can be defined across one or more physical storage devices. In another example, first node 830 transmits and stores all client data to distributed computing platform 802. In yet another example, client node 828 transmits and stores the data directly to distributed computing platform 802 without the use of first node 830.

The management of storage and access to data can be performed by one or more storage virtual machines (SVMs) or other storage applications that provide software as a service (SaaS) such as storage software services. In one example, an SVM may be hosted within client node 828, within first node 830, or within distributed computing platform 802 such as by the application server tier 806. In another example, one or more SVMs may be hosted across one or more of client node 828, first node 830, and distributed computing platform 802. The one or more SVMs may host instances of the storage operating system.

In an example, the storage operating system may be implemented for distributed computing platform 802. The storage operating system may allow client devices to access data stored within distributed computing platform 802 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of distributed computing platform 802, one or more SVMs may be hosted by the application server tier 806. For example, a server (1) 816 is configured to host SVMs used to execute applications such as storage applications that manage the storage of data of the client (1) within the client (1) data store 822. Thus, an SVM executing on the server (1) 816 may receive data and/or operations from client node 828 and/or first node 830 over the network 826. The SVM executes a storage application and/or an instance of the storage operating system to process the operations and/or store the data within the client (1) data store 822. The SVM may transmit a response back to client node 828 and/or first node 830 over the network 826, such as a success message or an error message. In this way, the application server tier 806 may host SVMs, services, and/or other storage applications using the server (1) 816, the server (N) 818, etc.

A user interface tier 804 of distributed computing platform 802 may provide client node 828 and/or first node 830 with access to user interfaces associated with the storage and access of data and/or other services provided by distributed computing platform 802. In an example, a service user interface 810 may be accessible from distributed computing platform 802 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 812, a client (N) user interface 814, etc. The client (1) can access various services and resources subscribed to by the client (1) through the client (1) user interface 812, such as access to a web service, a development environment, a human resource application, a warehouse tracking application, and/or other services and resources provided by the application server tier 806, which may use data stored within data storage tier 808.

Client node 828 and/or first node 830 may subscribe to certain types and amounts of services and resources provided by distributed computing platform 802. For example, client node 828 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, first node 830 can establish a subscription to have access to certain services and resources of distributed computing platform 802.

As shown, a variety of clients, such as client node 828 and first node 830, incorporating and/or incorporated into a variety of computing devices may communicate with distributed computing platform 802 through one or more networks, such as the network 826. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

Distributed computing platform 802, such as a multi-tenant business data processing platform or cloud computing environment, may include multiple processing tiers, including the user interface tier 804, the application server tier 806, and a data storage tier 808. The user interface tier 804 may maintain multiple user interfaces, including graphical user interfaces and/or web-based interfaces. The user interfaces may include the service user interface 810 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 810 may include components enabling a tenant to administer the tenant's participation in the functions and capabilities provided by distributed computing platform 802, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

Data storage tier 808 may include one or more data stores, which may include service data store 820 and one or more client data stores 822-824. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

Distributed computing platform 802 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 9:
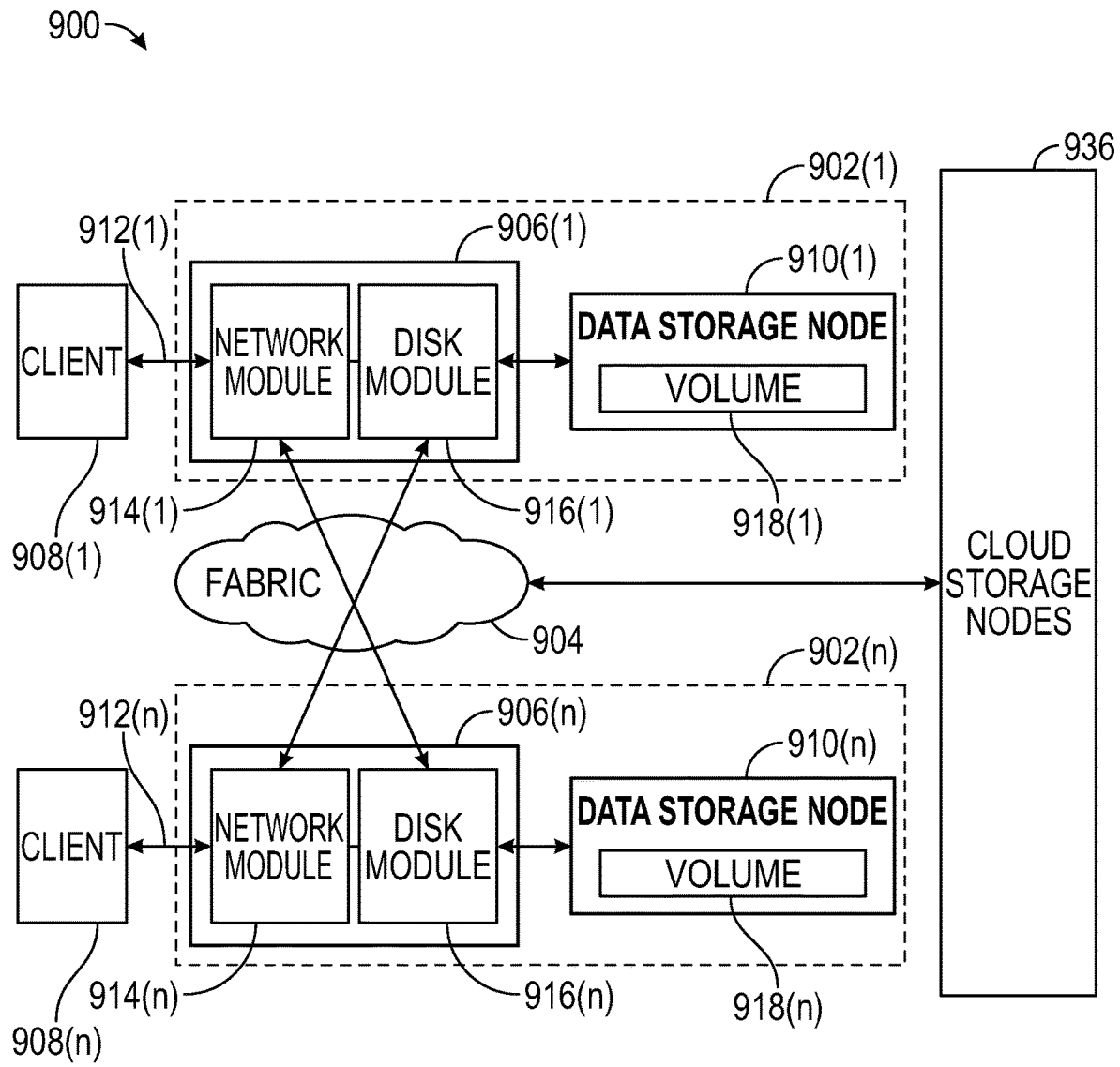
FIG. 9 is a schematic diagram illustrating an example of a network environment in accordance with one or more embodiments.

FIG. 9 is a schematic diagram illustrating an example of a network environment 900 in accordance with one or more embodiments. Network environment 900 illustrates another architecture for the principles described above with respect to FIG. 8. Furthermore, the embodiments described above may be implemented within one or more storage apparatuses, such as any single or multiple ones of data storage apparatuses 902(1)-902(n) of FIG. 9. For example, co-located journaling and data storage may be implemented within data storage nodes 910(1)-910(n). In one or more embodiments, nodes 102 in FIG. 1 may be implemented in a manner similar to data storage nodes 910(1)-910(n).

Network environment 900, which may take the form of a clustered network environment, includes data storage apparatuses 902(1)-902(n) that are coupled over a cluster or cluster fabric 904 that includes one or more communication network(s) and facilitates communication between data storage apparatuses 902(1)-902(n) (and one or more modules, components, etc. therein, such as, node computing devices 906(1)-906(n) (also referred to as node computing devices), for example), although any number of other elements or components can also be included in network environment 900 in other examples. This technology provides a number of advantages including methods, non-transitory computer-readable media, and computing devices that implement the techniques described herein.

In this example, node computing devices 906(1)-906(n) can be primary or local storage controllers or secondary or remote storage controllers that provide client devices 908(1)-908(n) (also referred to as client nodes) with access to data stored within data storage nodes 910(1)-910(n) (also referred to as data storage devices) and cloud storage node(s) 936 (also referred to as cloud storage device(s)). The node computing devices 906(1)-906(n) may be implemented as hardware, software (e.g., a storage virtual machine), or combination thereof.

Data storage apparatuses 902(1)-902(n) and/or node computing devices 906(1)-906(n) of the examples described and illustrated herein are not limited to any particular geographic areas and can be clustered locally and/or remotely via a cloud network, or not clustered in other examples. Thus, in one example data storage apparatuses 902(1)-902(n) and/or node computing device 906(1)-906(n) can be distributed over a plurality of storage systems located in a plurality of geographic locations (e.g., located on-premise, located within a cloud computing environment, etc.); while in another example a network can include data storage apparatuses 902(1)-902(n) and/or node computing device 906(1)-906(n) residing in a same geographic location (e.g., in a single on-site rack).

In the illustrated example, one or more of client devices 908(1)-908(n), which may be, for example, personal computers (PCs), computing devices used for storage (e.g., storage servers), or other computers or peripheral devices, are coupled to the respective data storage apparatuses 902(1)-902(n) by network connections 912(1)-912(n). Network connections 912(1)-912(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, client devices 908(1)-908(n) may be general-purpose computers running applications and may interact with data storage apparatuses 902(1)-902(n) using a client/server model for exchange of information. That is, client devices 908(1)-908(n) may request data from data storage apparatuses 902(1)-902(n) (e.g., data on one of the data storage nodes 910(1)-910(n) managed by a network storage controller configured to process I/O commands issued by client devices 908(1)-908(n)), and data storage apparatuses 902(1)-902(n) may return results of the request to client devices 908(1)-908(n) via the network connections 912(1)-912(n).

The node computing devices 906(1)-906(n) of data storage apparatuses 902(1)-902(n) can include network or host nodes that are interconnected as a cluster to provide data storage and management services, such as to an enterprise having remote locations, cloud storage (e.g., a storage endpoint may be stored within cloud storage node(s) 936), etc., for example. Such node computing devices 906(1)-906(n) can be attached to the cluster fabric 904 at a connection point, redistribution point, or communication endpoint, for example. One or more of the node computing devices 906(1)-906(n) may be capable of sending, receiving, and/or forwarding information over a network communications channel, and could comprise any type of device that meets any or all of these criteria.

In an example, the node computing devices 906(1) and 906(n) may be configured according to a disaster recovery configuration whereby a surviving node provides switchover access to the storage devices 910(1)-910(n) in the event a disaster occurs at a disaster storage site (e.g., the node computing device 906(1) provides client device 908(n) with switchover data access to data storage nodes 910(n) in the event a disaster occurs at the second storage site). In other examples, the node computing device 906(n) can be configured according to an archival configuration and/or the node computing devices 906(1)-906(n) can be configured based on another type of replication arrangement (e.g., to facilitate load sharing). Additionally, while two node computing devices are illustrated in FIG. 9, any number of node computing devices or data storage apparatuses can be included in other examples in other types of configurations or arrangements.

As illustrated in network environment 900, node computing devices 906(1)-906(n) can include various functional components that coordinate to provide a distributed storage architecture. For example, the node computing devices 906(1)-906(n) can include network modules 914(1)-914(n) and disk modules 916(1)-916(n). Network modules 914(1)-914(n) can be configured to allow the node computing devices 906(1)-906(n) (e.g., network storage controllers) to connect with client devices 908(1)-908(n) over the network connections 912(1)-912(n), for example, allowing client devices 908(1)-908(n) to access data stored in network environment 900.

Further, the network modules 914(1)-914(n) can provide connections with one or more other components through the cluster fabric 904. For example, the network module 914(1) of node computing device 906(1) can access the data storage node 910(n) by sending a request via the cluster fabric 904 through the disk module 916(n) of node computing device 906(n) when the node computing device 906(n) is available. Alternatively, when the node computing device 906(n) fails, the network module 914(1) of node computing device 906(1) can access the data storage node 910(n) directly via the cluster fabric 904. The cluster fabric 904 can include one or more local and/or wide area computing networks (i.e., cloud networks) embodied as Infiniband, Fibre Channel (FC), or Ethernet networks, for example, although other types of networks supporting other protocols can also be used.

Disk modules 916(1)-916(n) can be configured to connect data storage nodes 910(1)-910(n), such as disks or arrays of disks, SSDs, flash memory, or some other form of data storage, to the node computing devices 906(1)-906(n). Often, disk modules 916(1)-916(n) communicate with the data storage nodes 910(1)-910(n) according to the SAN protocol, such as SCSI or FCP, for example, although other protocols can also be used. Thus, as seen from an operating system on node computing devices 906(1)-906(n), the data storage nodes 910(1)-910(n) can appear as locally attached. In this manner, different node computing devices 906(1)-906(n), etc. may access data blocks, files, or objects through the operating system, rather than expressly requesting abstract files.

While network environment 900 illustrates an equal number of network modules 914(1)-914(n) and disk modules 916(1)-916(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of client devices 908(1)-908(n) can be networked with the node computing devices 906(1)-906(n) in the cluster, over the network connections 912(1)-912(n). As an example, respective client devices 908(1)-908(n) that are networked to a cluster may request services (e.g., exchanging of information in the form of data packets) of node computing devices 906(1)-906(n) in the cluster, and the node computing devices 906(1)-906(n) can return results of the requested services to client devices 908(1)-908(n). In one example, client devices 908(1)-908(n) can exchange information with the network modules 914(1)-914(n) residing in the node computing devices 906(1)-906(n) (e.g., network hosts) in data storage apparatuses 902(1)-902(n).

In one example, storage apparatuses 902(1)-902(n) host aggregates corresponding to physical local and remote data storage devices, such as local flash or disk storage in the data storage nodes 910(1)-910(n), for example. One or more of the data storage nodes 910(1)-910(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 918(1)-918(n) in this example, although any number of volumes can be included in the aggregates. The volumes 918(1)-918(n) are virtual data stores or storage objects that define an arrangement of storage and one or more filesystems within network environment 900. Volumes 918(1)-918(n) can span a portion of a disk or other storage device, a collection of disks, or portions of disks, for example, and typically define an overall logical arrangement of data storage. In one example volumes 918(1)-918(n) can include stored user data as one or more files, blocks, or objects that may reside in a hierarchical directory structure within the volumes 918(1)-918(n).

Volumes 918(1)-918(n) are typically configured in formats that may be associated with particular storage systems, and respective volume formats typically comprise features that provide functionality to the volumes 918(1)-918(n), such as providing the ability for volumes 918(1)-918(n) to form clusters, among other functionality. Optionally, one or more of the volumes 918(1)-918(n) can be in composite aggregates and can extend between one or more of the data storage nodes 910(1)-910(n) and one or more of the cloud storage node(s) 936 to provide tiered storage, for example, and other arrangements can also be used in other examples.

In one example, to facilitate access to data stored on the disks or other structures of the data storage nodes 910(1)-910(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 910(1)-910(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 910(1)-910(n) can have one or more physical ports, wherein each physical port can be assigned a target address (e.g., SCSI target address). To represent respective volumes, a target address on the data storage nodes 910(1)-910(n) can be used to identify one or more of the LUNs. Thus, for example, when one of the node computing devices 906(1)-906(n) connects to a volume, a connection between the one of the node computing devices 906(1)-906(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

The present embodiments can take the form of an entirely hardware embodiment, an entirely software embodiment, or an embodiment containing both hardware and software elements. Accordingly, it is understood that any operation of the computing systems of the computing environment 800 in FIG. 8, network environment 900 in FIG. 9, and distributed storage system 100 in FIG. 1 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving, by a first node of a plurality of nodes of a cluster representing a distributed storage system, a write request from a client, wherein each of the plurality of nodes is implemented in a form of a virtual platform within a cloud computing environment;
   identifying, by the first node, a logical storage unit containing or corresponding to a volume to which data of the write request is to be stored, wherein the logical storage unit is divided into a journal partition and a volume partition representing the volume, wherein the journal partition includes two logs one of which represents an active log at a given time during which the other of the two logs represents an inactive log; and
   reducing, by the first node, write latency experienced by the client, by:
      causing the data and metadata associated with the write request to be persisted to disk by journaling the metadata and the data to the active log of the journal partition of the identified logical storage unit; and
      confirming handling of the write request to the client after the metadata and the data have been journaled but prior to persisting the data to the volume partition of the identified logical storage unit.

2. The method of claim 1, further comprising maintaining client access to the data after a failure associated with the first node by replaying, by a second node of the plurality of nodes, the active log of the identified logical storage unit in response to the failure.

3. The method of claim 1, further comprising:
   switching, by the first node, which of the two logs of the journal partition of the identified logical storage unit represents the active log and the inactive log; and
   flushing the inactive log of journal partition of the identified logical storage unit to the volume partition of the identified logical storage unit, including updating based on file system metadata in a super block of the volume partition of the identified logical storage unit corresponding to a first location within the journal partition of the identified logical storage unit in which the metadata is stored and copying the data from a second location within the journal partition of the identified logical storage unit to a new location in the volume partition of the identified logical storage unit.

4. The method of claim 1, further comprising:
   switching, by the first node, which of the two logs of the journal partition of identified logical storage unit represents the active log and the inactive log; and
   copying, by the first node, the data from a second location within the inactive log in the journal partition of the identified logical storage unit to a new location in the volume partition of the identified logical storage unit; and
   mirroring, by a second node of the plurality of nodes, the copying performed by the first node.

5. The method of claim 1, further comprising:
   switching, by the first node, which of the two logs of the journal partition of identified logical storage unit represents the active log and the inactive log; and
   updating a super block in the volume partition of the identified logical storage unit corresponding to a first location within the inactive log of the journal partition of the identified logical storage unit based on the metadata stored within the first location.

6. The method of claim 1, further comprising:
   switching, by the first node, which of the two logs of the journal partition of identified logical storage unit represents the active log and the inactive log; and updating, by the first node, a new location in the volume partition of the identified logical storage unit with a cryptographic hash value associated with the data stored within a second location of the inactive log of journal partition of the identified logical storage unit; and mirroring, by a second node of the plurality of nodes, the updating performed by the first node.

7. The method of claim 1, further comprising:
switching, by the first node, which of the two logs of the journal partition of identified logical storage unit represents the active log and the inactive log; and
flushing the inactive log of the journal partition of the identified logical storage unit to the volume partition of the identified logical storage unit, including associating a hash value of the data within a second location of the journal partition of the active log of the identified logical storage unit with a new location in the volume partition.

8. The method of claim 1, wherein the identified logical storage unit comprises a logical unit number (LUN).

9. The method of claim 1, wherein the metadata comprises a cryptographic hash value of the data.

10. A method comprising:
maintaining, by a first node of a plurality of nodes of a cluster representing a distributed storage system, a plurality of logical storage units, wherein each of the plurality of nodes is implemented in a form of a virtual platform within a cloud computing environment, wherein each logical storage unit of the plurality of logical storage units is divided into a journal partition and a volume partition representing a volume, wherein the journal partition includes two logs, one of which represents an active log at a given time during which the other of the two logs represents an inactive log;
receiving, by the first node, write requests from clients;
mitigating delay associated with journaling of the write requests by co-locating the journaling and storage of data associated with the write requests by:
for each write request of the write requests, identifying, by the first node, a logical storage unit of the plurality of logical storage units in which the volume of the logical storage unit corresponds to a particular volume to which data of the write request is to be stored; and
causing, by the first node, metadata associated with the write request and the data to be persisted to disk by journaling the metadata and the data to the active log of the journal partition of the identified logical storage unit.

11. The method of claim 10, further comprising:
switching, by the first node, which of the two logs of the journal partition of identified logical storage unit represents the active log and the inactive log; and
while the active log of the journal partition of the identified logical storage unit is used for journaling, flushing the inactive log of journal partition of the identified logical storage unit to the volume partition of the identified logical storage unit.

12. The method of claim 11, wherein said flushing comprises copying data from logical block addresses (LBAs) of the inactive log of the journal partition of the identified logical storage unit to new LBAs in the volume partition of the identified logical storage unit.

13. The method of claim 11, wherein said flushing comprising updating a new location in the volume partition of the identified logical storage unit with a cryptographic hash value of the data in a logical block address (LBA) of the journal partition of the identified logical storage unit.

14. A distributed storage system comprising:
a plurality of physical storage devices provided by a cloud computing environment, wherein the plurality of physical storage devices are associated with respective logical storage units, wherein each logical storage unit of the logical storage unit includes a partitioned storage means for co-locating journaling of write requests and storage of data associated with the write requests; and
a cluster of a plurality of nodes coupled in communication with the plurality of physical storage devices, wherein each node of the plurality of nodes is implemented in a form of a virtual platform within the cloud computing environment, and wherein each node of the plurality of nodes is operable to, during a single input/output operation, journal metadata and data associated with a given write request received from a client to the partitioned storage means of a logical storage unit of the logical storage units containing or corresponding to a volume to which the data is to be written.

15. The distributed storage system of claim 14, wherein the partitioned storage means includes a journal partition and a volume partition representing a volume, wherein the journal partition includes two logs one of which operates in a role of an active log at a given time during which the other of the two logs operates in a role of an inactive log.

16. The distributed storage system of claim 15, wherein responsive to a trigger event:
the respective roles in accordance with which the two logs of the journal partition of the logical storage unit operate are switched; and
the inactive log of the journal partition of the logical storage unit is flushed to the volume partition of the logical storage unit.

17. The distributed storage system of claim 16, wherein flushing of the inactive log of the journal partition of the logical storage unit includes copying data from logical block addresses (LBAs) of the inactive log of the journal partition of the logical storage unit to new LBAs in the volume partition of the logical storage unit.

18. The distributed storage system of claim 16, wherein flushing of the inactive log of the journal partition of the logical storage unit includes updating a new location in the volume partition of the logical storage unit with a cryptographic hash value of the data in a logical block address (LBA) of the journal partition of the logical storage unit.

19. The distributed storage system of claim 14, wherein the logical storage unit comprises a logical unit number (LUN).

20. The distributed storage system of claim 14, wherein the metadata comprises a cryptographic hash value of the data.

21. A non-transitory computer-readable storage medium embodying instructions, which when executed by a processing resource of a cluster of virtual platforms collectively representing a distributed storage system, cause the cluster to:
maintain a plurality of logical storage units each of which is divided into a journal partition and a volume partition representing a volume, wherein the journal partition includes two logs, one of which represents an active log at a given time during which the other of the two logs represents an inactive log;

receive write requests from clients; and
distribute journaling of the write requests across the plurality of logical storage units by:
for a given write request of the write request, co-locating the journaling and storage of data associated with the given write request within a particular logical storage unit in which the volume of the logical storage unit corresponds to a particular volume to which data of the write request is to be stored; and
cause metadata associated with the given write request and the data to be concurrently persisted to disk by journaling the metadata and the data to the active log of the journal partition of the particular logical storage unit.

22. The non-transitory computer-readable storage medium of claim 21, wherein the instructions further cause the cluster to:
switch which of the two logs of the journal partition of the particular logical storage unit represents the active log and the inactive log; and
flush the inactive log of journal partition of the particular logical storage unit to the volume partition of the particular logical storage unit, including updating based on file system metadata in a super block of the volume partition of the particular logical storage unit corresponding to a first location within the journal partition of the particular logical storage unit in which the file system metadata is stored and copying the data from a second location within the journal partition of the particular logical storage unit to a new location in the volume partition of the particular logical storage unit.

23. The non-transitory computer-readable storage medium of claim 21, wherein the instructions further cause the cluster to:
switch which of the two logs of the journal partition of particular logical storage unit represents the active log and the inactive log; and
copy the data from a second location within the inactive log in the journal partition of the particular logical storage unit to a new location in the volume partition of the particular logical storage unit.

24. The non-transitory computer-readable storage medium of claim 21, wherein the instructions further cause the cluster to:
responsive to a trigger event, switch which of the two logs of the journal partition of particular logical storage unit represents the active log and the inactive log; and
updating a super block in the volume partition of the particular logical storage unit corresponding to a first location within the inactive log of the journal partition of the particular logical storage unit based on the metadata stored within the first location.

25. The non-transitory computer-readable storage medium of claim 21, wherein the instructions further cause the cluster to:
responsive to a trigger event, switch by which of the two logs of the journal partition of particular logical storage unit represents the active log and the inactive log; and
update a new location in the volume partition of the particular logical storage unit with a cryptographic hash value associated with the data stored within a second location of the inactive log of journal partition of the particular logical storage unit.

26. The non-transitory computer-readable storage medium of claim 21, wherein the instructions further cause the cluster to:
responsive to a trigger event, switch which of the two logs of the journal partition of particular logical storage unit represents the active log and the inactive log; and
flush the inactive log of the journal partition of the particular logical storage unit to the volume partition of the particular logical storage unit, including associating a hash value of the data within a second location of the journal partition of the active log of the particular logical storage unit with a new location in the volume partition.

27. A non-transitory computer-readable storage medium embodying instructions, which when executed by a processing resource of a cluster of virtual platforms collectively representing a distributed storage system, cause the cluster to:
maintain a plurality of logical storage units each of which is divided into a journal partition and a volume partition representing a volume, wherein the journal partition includes two logs, one of which operates in a role of an active log at a given time during which the other of the two logs operates in a role of an inactive log;
receive a write request from a client;
causing the data and metadata associated with the write request to be concurrently persisted to disk by journaling the metadata and the data to the active log of the journal partition of a particular logical storage unit of the plurality of logical storage units in which the volume of the particular logical storage unit containing or corresponding to a particular volume to which data of the write request is to be stored; and
confirming handling of the write request to the client after the metadata and the data have been journaled but prior to persisting the data to the volume partition of the identified logical storage unit, thereby reducing write latency experienced by the client for the write request.

28. The non-transitory computer-readable storage medium of claim 27, wherein the instructions further cause the cluster to:
switch the respective roles in accordance with which the two logs of the journal partition of the particular logical storage unit operate; and
flush the inactive log of the journal partition of the particular logical storage unit to the volume partition of the particular logical storage unit.

29. The non-transitory computer-readable storage medium of claim 27, wherein flushing of the inactive log of the journal partition of the particular logical storage unit includes copying data from logical block addresses (LBAs) of the inactive log of the journal partition of the particular logical storage unit to new LBAs in the volume partition of the particular logical storage unit.

30. The non-transitory computer-readable storage medium of claim 27, wherein flushing of the inactive log of the journal partition of the particular logical storage unit includes updating a new location in the volume partition of the particular logical storage unit with a cryptographic hash value of the data in a logical block address (LBA) of the journal partition of the particular logical storage unit.

* * * * *